United States Patent [19]
Collins et al.

[11] Patent Number: 5,902,652
[45] Date of Patent: May 11, 1999

[54] METHODS OF CONSTRUCTION OF EVACUATED GLAZING

[75] Inventors: Richard Edward Collins, Rouse Hill; Jian-Zheng Tang, Merrylands, both of Australia

[73] Assignee: University of Sydney, Sydney, Australia

[21] Appl. No.: 08/571,913

[22] PCT Filed: Jun. 7, 1994

[86] PCT No.: PCT/AU94/00305

§ 371 Date: Mar. 27, 1996

§ 102(e) Date: Mar. 27, 1996

[87] PCT Pub. No.: WO95/01493

PCT Pub. Date: Jan. 12, 1995

[30] Foreign Application Priority Data

Jun. 30, 1993 [AU] Australia ................ PL 9708

[51] Int. Cl.⁶ .......................................... E06B 3/24
[52] U.S. Cl. ............................. 428/34; 52/786.13
[58] Field of Search .................. 428/34, 120; 52/786.1, 52/786.13

[56] References Cited

U.S. PATENT DOCUMENTS

| | | | |
|---|---|---|---|
| 1,370,974 | 3/1921 | Kirlin | 428/34 |
| 2,168,216 | 8/1939 | Kennedy et al. | 20/56.5 |
| 2,198,578 | 4/1940 | Hazelton, Jr. et al. | 20/56.5 |
| 2,749,579 | 6/1956 | Shaw | 20/56.5 |
| 2,896,272 | 7/1959 | Latenser | 20/56.5 |
| 3,027,607 | 4/1962 | Badger et al. | 20/56.5 |
| 3,472,640 | 10/1969 | Stockdale | 65/43 |
| 3,778,126 | 12/1973 | Wilson | 316/20 |
| 3,778,127 | 12/1973 | Langston, Jr. et al. | 316/20 |
| 3,914,000 | 10/1975 | Beckerman et al. | 65/34 |
| 3,947,260 | 3/1976 | Salisbury | 65/42 |
| 3,961,871 | 6/1976 | Kurio | 418/121 |
| 3,990,201 | 11/1976 | Falbel | 52/171 |
| 4,038,797 | 8/1977 | Hermann et al. | 52/306 |
| 4,125,390 | 11/1978 | Kawai et al. | 65/34 |
| 4,184,480 | 1/1980 | Kenny | 52/200 |
| 4,186,723 | 2/1980 | Coppola et al. | 52/200 |
| 4,312,457 | 1/1982 | Allaire | 220/2.1 |
| 4,359,042 | 11/1982 | Belentepe et al. | 126/443 |
| 4,393,105 | 7/1983 | Kreisman | 428/34 |
| 4,683,154 | 7/1987 | Benson et al. | 428/34 |
| 4,786,344 | 11/1988 | Beuther | 428/34 |
| 5,009,218 | 4/1991 | Bächli | 428/34 |
| 5,124,185 | 6/1992 | Kerr et al. | 428/34 |
| 5,270,084 | 12/1993 | Parker | 428/34 |
| 5,664,395 | 9/1997 | Collins et al. | 428/34 |

FOREIGN PATENT DOCUMENTS

| | | |
|---|---|---|
| 290981 | 5/1969 | Australia . |
| 16618 | 7/1969 | Australia . |
| 610672 | 7/1987 | Australia . |
| 91/02878 | 3/1991 | Australia . |
| 0 047 725 | 4/1981 | European Pat. Off. . |

(List continued on next page.)

OTHER PUBLICATIONS

John D. Garrison, "A Thermally Insulating Vacuum Window" (undated).

Primary Examiner—Donald Loney

[57] ABSTRACT

The inventions described in this specification concern a number of improvements to the design of thermally insulating glass panels (10, 11). The first improvement concerns the support pillars (12), and in particular a method of designing the pillar radius and spacing, and a panel (10, 11) constructed in accordance with the design constraints of the method. The second improvement concerns the edge seal (13), and in particular a method of constructing a thermally insulating glass panel (10, 11) with a superior edge seal (13), and a panel (10, 11) incorporating the superior seal (13). The third improvement concerns the evacuation of the panels (10, 11), and in particular method of improving the evacuation of the panels (10, 11) during construction, and a panel (10, 11) produced by the improved method. The fourth improvement concerns the pump-out tube, in particular a panel (10, 11) incorporating the improved pump-out tube, and a method of constructing such panels (10, 11).

6 Claims, 5 Drawing Sheets

FOREIGN PATENT DOCUMENTS

| | | |
|---|---|---|
| 0 421 239 A2 | 4/1991 | European Pat. Off. . |
| 921 946 | 9/1946 | France . |
| 1 154.921 | 6/1956 | France . |
| A-2 277 964 | 9/1973 | France . |
| 2 294 315 | 9/1974 | France . |
| C-907 821 | 3/1954 | Germany . |
| 29 18 581 | 11/1980 | Germany . |
| 200585 | 1/1937 | Switzerland . |
| 588 008 | 11/1975 | Switzerland . |
| 950839 | 2/1964 | United Kingdom . |
| 1141281 | 1/1969 | United Kingdom . |
| 1 251 592 | 1/1970 | United Kingdom . |
| 2 095 290 | 9/1982 | United Kingdom . |
| WO 87/03327 | 12/1985 | WIPO . |
| 90/00364 | 3/1991 | WIPO . |
| WO 93/15296 | 1/1992 | WIPO . |

METHODS OF CONSTRUCTION OF EVACUATED GLAZING

BACKGROUND OF THE INVENTION

The inventions described in this specification concern a number of improvements to the design of thermally insulating glass panels. These panels typically comprise two spaced apart sheets of glass enclosing a low pressure space and interconnected by an edge seal and an array of support pillars. The panels are used for glazing, and such thermally insulating windows are generally referred to as evacuated glazing.

Thermally insulating panels are typically constructed by depositing a strip of solder glass around the periphery of the glass sheets; depositing an array of support pillars onto one or other of the sheets of glass; bringing the sheets together or permitting them to move together; heating the panels to melt the solder glass around the periphery so that the two sheets settle onto the pillars; and then cooling the panel to solidify the edge seal. The panel is then evacuated by pumping out through a tube positioned either through one of the glass sheets or through the edge seal, and finally the pump-out tube is melted and sealed off.

SUMMARY OF THE INVENTION

The first improvement concerns the support pillars, and in particular a method of designing the pillar radius and spacing, and a panel constructed in accordance with the design constraints of the method.

The second improvement concerns the edge seal, and in particular a method of constructing a thermally insulating glass panel with a superior edge seal, and a panel incorporating the superior seal.

The third improvement concerns the evacuation of the panels, and in particular a method of improving the evacuation of the panels during construction, and a panel produced by the improved method.

The fourth improvement concerns the pump-out tube, in particular a panel incorporating the improved pump-out tube, and a method of constructing such panels.

Several conditions must be satisfied in the construction of evacuated glazing. First, it is necessary to produce an hermetic (leak-free) edge seal around the periphery of the panel. Second, in order to prevent the glass sheets from being forced into contact with each other, by the large atmospheric pressure forces acting, it is essential to include an array of support pillars within the glazing. Third, the space between the glass sheets must be evacuated to a high level, and this level of vacuum maintained over the life of the glazing. Fourth, in order to reduce radiative heat flow through the glass, a low emittance coating is applied to the inner surfaces of one or both sheets of glass.

DETAILED DESCRIPTION OF THE PREFERRED EMBODIMENT AND/OR METHOD OF EACH IMPROVEMENT

The First Improvement

The Support Pillars

Background

Several factors have been identified which influence the design choices for the dimensions of a pillar array, in particular the pillar radius and the pillar spacing or separation. Essentially, the design of the pillar array is a tradeoff between reducing the mechanical tensile stress within the glass sheets (which necessitates more and larger pillars), and reducing the heat flow through the pillars (which requires few, and smaller pillars).

Two areas of tensile stress have previously been identified. First, mechanical tensile stress exists on the outer surfaces of the glass sheets of the evacuated glazing in the areas above the pillars. This stress arises from the bendings of the sheets over the pillars due to atmospheric pressure forces. Second, stress exists on the inner surface of glass sheets in the areas immediately adjacent to the pillars. The stresses in these areas are very similar to classical Hertzian indenter stresses and can cause conical fractures of the glass adjacent to the pillars.

Summary of the Improvement

According to a first aspect, the present invention provides a method of designing the pillar radius and separation, for the array of support pillars in a thermally insulating glass panel. The method may comprise the conventional steps of:

selecting the pillar separation to ensure that tensile stress on the outer surface of the glass sheets is below a predetermined value;

selecting the pillar separation and radius to ensure that conical indentor fracture does not occur on the inner surfaces of the glass sheets;

selecting the pillar separation and radius to ensure that thermal conductance of the array is below a predetermined value; and the essential step of:

selecting the pillar separation and radius to ensure the mechanical compressive stress within each pillar is below a predetermined value.

If the fourth criteria, namely a selection to take into account the mechanical compressive stresses within the pillars, is not taken into account then the pillars may deform inelastically, and the separation of the glass sheets away from the edge seal will be less than in the vicinity of the edge. This leads to the glass sheets bending near the edge and causes large tensile stresses on the external surfaces of the sheets of glass increasing the probability of fracture.

An additional factor is that the pillars must be able to withstand the manufacturing regime of the evacuated glazing. In particular, in some manufacturing processes it is necessary to heat the entire structure to around 500° C. in order to form the edge seal. The edge seal is normally made using a material called solder glass which has a melting point lower than the softening point of the glass sheets themselves. The pillar materials must maintain their low temperature strength characteristics after such a high temperature cycle.

Taking the temperature requirement in account, together with the fourth criteria reduces the number of materials from which the pillars may be selected. The pillar material must have sufficiently high compressive strength. Suitable materials include hardened tungsten, tantalum, molybdenum, high strength steel alloys, ceramic materials including high strength alumina (aluminium oxide), zirconia (zirconium dioxide), and ceramics containing a large proportion of these materials.

According to a second aspect, the present invention provides a thermally insulating glass panel comprising two spaced-apart sheets of glass enclosing a low pressure space and interconnected by an edge seal and an array at support pillars. The pillar separation may be selected to ensure that tensile stress on the outer surface of the glass sheets is below a predetermined value; and the pillar separation and radius may be selected to ensure that conical indentor factor does not occur on the inner surface of the glass sheets, that thermal conductance of the array is below a predetermined value, and essentially, to ensure the mechanical compressive stress within each pillar is below a predetermined value.

Preferably the pillars are made from a material with a mechanical compressive strength of greater than 750 MPa, and advantageously greater than 1000 MPa.

Preferably the pillars are made from one of the following suitable materials: hardened tungsten, tantalum, molybdenum, high strength steel alloys, ceramic materials including high strength alumina (aluminium oxide), zirconia (zirconium dioxide), and ceramics containing a large proportion of these materials.

Brief Description of the Drawings

This invention will now be described, by way of example only, with reference to FIG. 1 which is graphical representation of the design constraints.

Best Mode for Carrying Out the First Improvement

Figure 1:
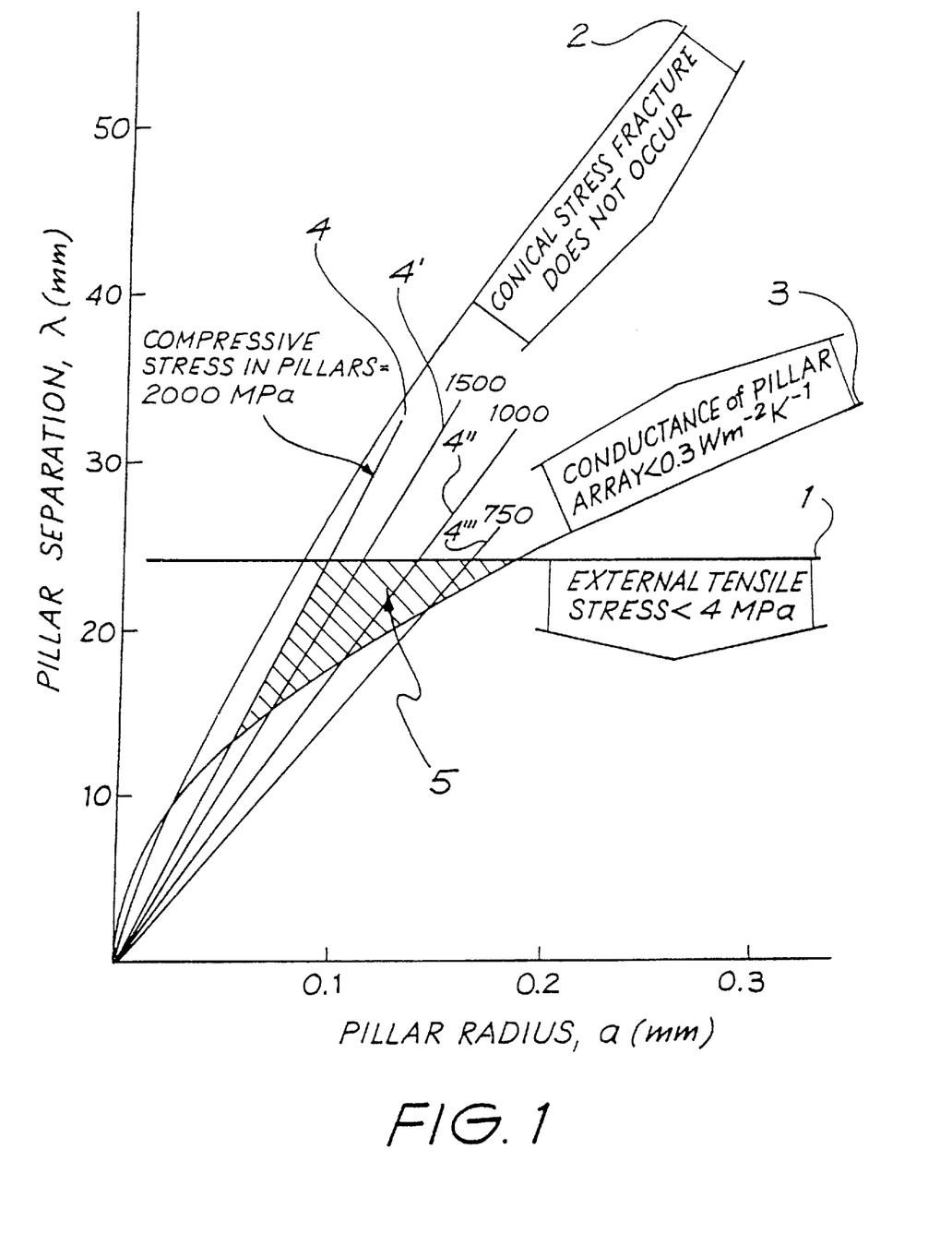
FIG. 1 is a graphical representation of the design constraints relating to the construction of a glazing panel in accordance with the first improvement.

FIG. 1 shows the allowable values for pillar separation and pillar radius which satisfy four design constraints.

In the example shown 4 MPa is taken as a reasonable level of tensile stress on the outer surfaces of the glass sheets. In order that the stresses on the outer surfaces of the glass sheets above the pillar should be less than 4 MPa, the values of pillar separation and pillar radius should lie in the region below the horizontal line 1.

Similarly if conical indentor fracture on the inner surfaces of the glass sheets, adjacent to the pillars, is not to occur, then values of pillar separation and pillar radius should be to the right of line 2.

The thermal conductance of the pillar array can be calculated by considering the heat flow through individual pillars. If the value of 0.3 $Wm^{-2}K^{-1}$ is considered to be a maximum acceptable value then values of pillar separation and radius should lie above and to the left of curve 3. This curve has been calculated for glass pillars which have height equal to radius. The curve for metal pillars is higher than the one shown in FIG. 1 by a factor of approximately 1.3.

Fourth, the mechanical compressive stresses within the pillars themselves need to be taken into account. The stresses within the pillars can be calculated quite simply; for a square array of pillars with separation $\lambda$, the force on each pillar in the array is $q\lambda^2$, where q is the magnitude of the atmospheric pressure. The cross-sectional area of a cylindrical pillar of radius a is $\pi a^2$. Thus, the compressive stress within a single pillar due to atmospheric forces is $q\lambda^2/\pi a^2$. In order for the mechanical compressive stress within the pillar to be less than a specified value it must be to the right and below the appropriate lines marked 4, 4', 4" and 4'".

The hatched area designated 5 indicates the design region which satisfies the first three constraints together with a compressive stress in the pillars of less than or equal to 2,000 MPa.

It should be appreciated that the allowable design values for pillar separation and a radius may change depending on the particular specifications chosen For the various values of stresses and heat flow, the shape of the pillars, and the material from which the pillars are constructed. Typically, and taking into account a high temperature manufacturing regime, suitable materials for the pillars should have a mechanical compressive strength of more than 750 MPa, and ideally more than 1000 MPa.

Such materials include hardened tungsten, tantalum and molybdenum, and high strength steel alloys. Ceramic materials may also be useful provided they have sufficiently high strength, and appropriate ceramic materials include high strength alumina (aluminium oxide), zirconia (zirconium dioxide), and ceramics containing large proportions of these materials.

The Second Improvement

The Edge Seal

Background

One of the methods of forming the edge seal around the periphery of evacuated glazing is to use a low melting point glass (solder glass). In order to manufacture such an edge seal, solder glass is deposited as a liquid slurry onto the surface of one or both of the glass sheets, around the edges. The glass sheets are brought together and the entire assembly is heated to a temperature at which the solder glass melts, wets the surface of the glass sheets, and flows to produce a hermetic seal between the sheets.

One of the difficulties is that even at the high temperatures used the solder glass possesses a relatively high viscosity, and it does not flow readily between the glass sheets. If there is too much solder glass in the gap between the sheets, it may not flow out of the gaps sufficiently to allow the upper sheet to settle down onto the pillars during the edge sealing process. This leads to large tensile stresses in the glass sheets near their edges when the vacuum is eventually created.

Summary of the Second Improvement

According to the first aspect, the invention provides a method of forming the edge seal for a thermally insulating glass panel, comprising two spaced apart sheets of glass enclosing a low pressure space interconnected by an edge seal and an array of pillars; the method including the steps of:

(a) preparing first and second sheets of glass such that when they are brought together their edges are not in registration, and at any point around the periphery of the panel the edge of one of the sheets of glass extends beyond the edge of the other;

(b) depositing a strip of solder glass around the periphery of the panel on the extending edges of the glass sheets;

(c) heating the panel to melt the solder glass such that it runs between the glass sheets; and (d) cooling the panel to solidify the solder glass.

In this way solder glass does not intrude between the sheets before it is melted, thereby overcoming the problem identified in the prior art.

The first and second glass sheets are conveniently prepared by making one slightly smaller than the other. For instance the upper glass sheet may be 5 mm less than the lower on all sides; in other words 10 mm less in each orthogonal direction.

The solder glass strip may be deposited on the extending edges such that it bridges the gap between the sheets and contacts the end edge of the other sheet.

Another advantage of the method is that the solder glass flows into the gap between the two glass sheets a uniform distance all around the periphery of the panel.

The edge seals are therefore formed with a relatively constant width which gives the finished panels an excellent appearance and a high mechanical strength. Typically the width of the bonded region between the glass sheets is between 3 and 10 mm.

According to a second aspect the invention provides a thermally insulating glass panel comprising two spaced apart sheets of glass enclosing a low pressure space interconnected by an edge seal and an array of pillars, wherein:

the glass sheets are sized or configured, or both, such that their edges are not in registration, and at any point around the periphery of the panel the edge of one of the sheets extends beyond the edge of the other.

Preferably one of the sheets is slightly smaller than the other. For example, by 5 mm on all sides.

Brief Description of the Drawings

Figure 2A:
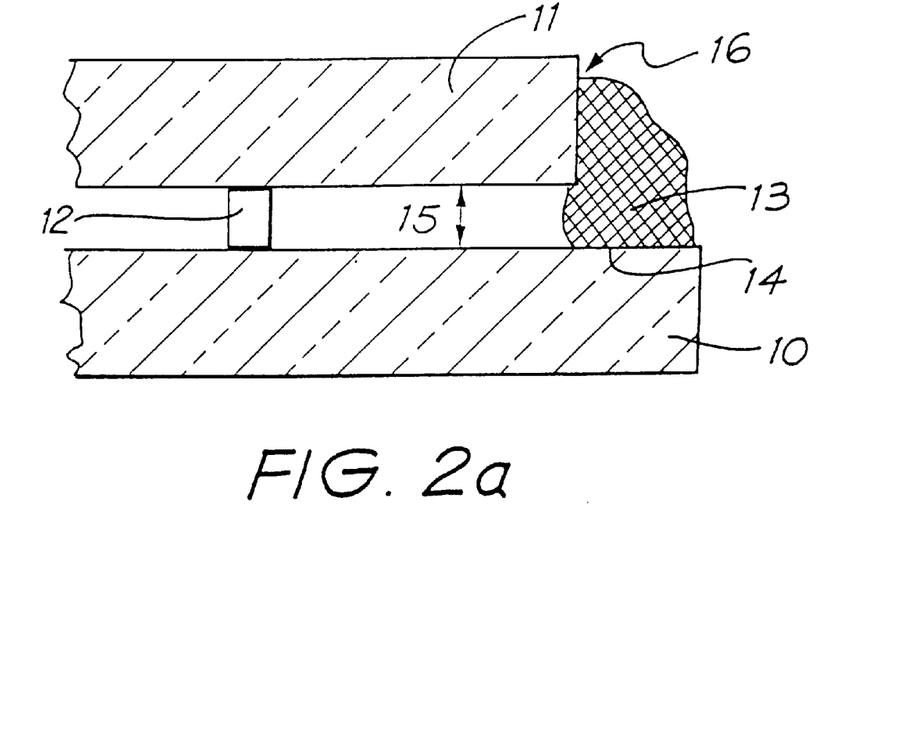
FIG. 2a shows the detail of the edge of a panel under construction before the solder glass is melted in accordance with the second improvement.
Figure 2B:
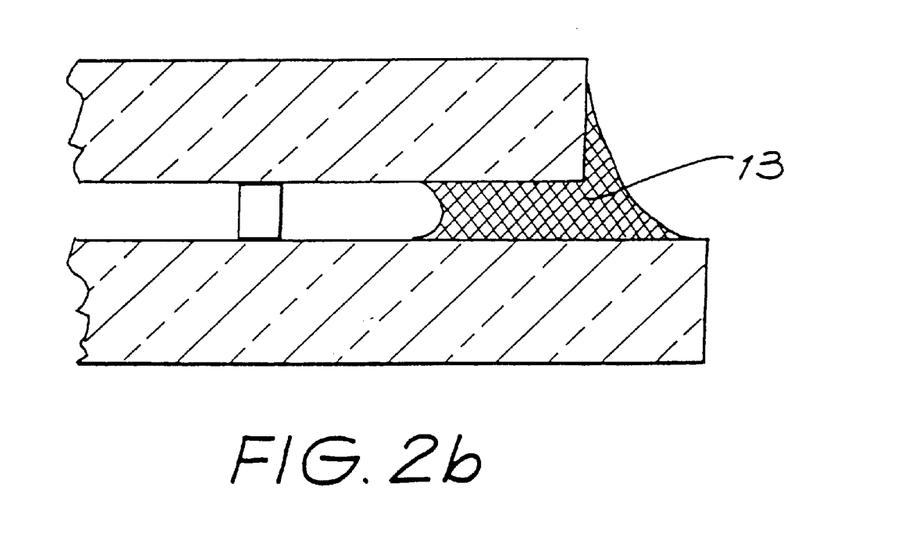
FIG. 2b shows the same detail as FIG. 2a after the solder glass has been melted in accordance with the second improvement.

The invention will now be described, by way of example only, with reference to the accompanying drawings, in which:

FIG. 2a shows a detail of the edge of a panel under construction before the solder glass is melted; and FIG. 2b shows the same detail after the solder glass has been melted.

Best Mode for Carrying Out the Second Improvement

The lower glass sheet 10 is slightly larger than the upper glass sheet 11 which rests on an array of support pillars 12 at a predetermined spacing above lower sheet 10. A strip of solder glass 13 is laid on the extending edge 14 by which the edge of lower sheet 10 extends beyond the edge of upper sheet 11. The solder glass is deposited either as a liquid slurry, a powder, or a rod. The strip of solder glass 13 bridges the gap 15 between the glass sheets and contacts the end edge 16 of upper glass sheet 10.

When the construction is heated and the solder glass melts, it flows between the two glass sheets 10 and 11 by the action of capillary forces. The distance the solder glass flows can be controlled by varying the time and temperature of the process. In this way it is not necessary for solder glass between the two glass sheets to be expelled by the weight of the upper glass sheet.

It should be appreciated that although this invention has been described with reference to a specific example it need not be limited to that embodiment. For example, one glass sheet need not be a slightly different size to the other and both sheets could be the same size provided they were translated out of registration with each other in both orthogonal directions.

The Third Improvement

The Evacuation Process

Introduction

One of the essential steps in the manufacture of evacuated glazing is the creation of the low pressure space between the glass sheets; commonly referred to as the evacuation process.

Background of the Third Improvement

The space between the glass sheets is generally evacuated through a small tube located at or near a corner of the panel. Conventional pumping techniques are used to reduce the pressure, and the panel is heated to remove dissolved gases from the surface of the glass. Subsequently the structure is cooled and the tube through which evacuation takes place, the pump-out tube, is melted and sealed to complete the cavity. In some designs, reactive materials, called "getters", are incorporated into the cavity in order to absorb gases which are emitted from the internal surfaces during the lifetime of the panel.

One of the problems is the comparatively long period of time necessary to evacuate the panel. The time necessary for evacuation depends on many factors including the dimensions of the pump-out tube, the area of the panel, and the size of the gap between the sheets.

Summary of the Third Improvement

According to a first aspect, the present invention provides a method of evacuating a thermally insulating glass panel comprising two spaced apart sheets of glass enclosing a low pressure space interconnected by an edge seal and an array of pillars; the method including the steps of:

(a) positioning a pump-out tube at or near the midpoint along one side of one of the glass sheets; and (b) evacuating the space within the panel by pumping out through the pump-out tube.

Using this method the time required to evacuate the space between the glass sheets can be reduced substantially, by up to half in comparison with the earlier technique where the pump-out tube was positioned at a corner of the panel.

In a further aspect the invention provides a thermally insulating glass panel comprising two spaced apart sheets of glass enclosing a low pressure space and interconnected by an edge seal and an array of support pillars, wherein the panel further incorporates a pumpout tube positioned at or near the midpoint along one of the sides of the panel. Such a panel has the advantage of being manufactured in a shorter time than earlier panels as a result of the pump-out tube being positioned away from a corner of the panel, near to the midpoint of one of the sides rather than at a corner.

Brief Description of the Drawings

Figure 3A:
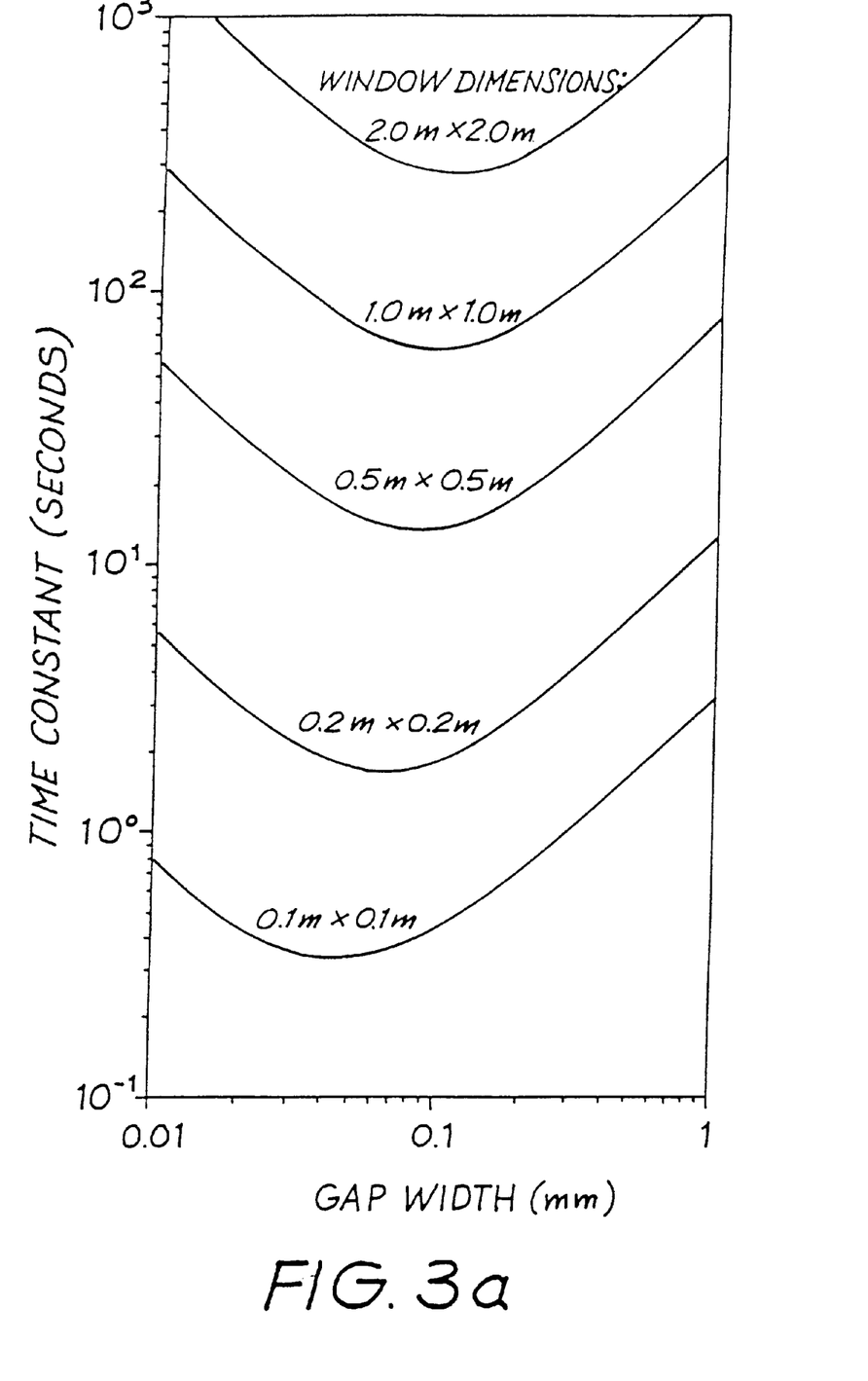
FIG. 3a is a graph showing time constant for pressure reduction in evacuated panels of various lateral dimensions as a function of the gap between the glass sheets in accordance with the third improvement.
Figure 3B:
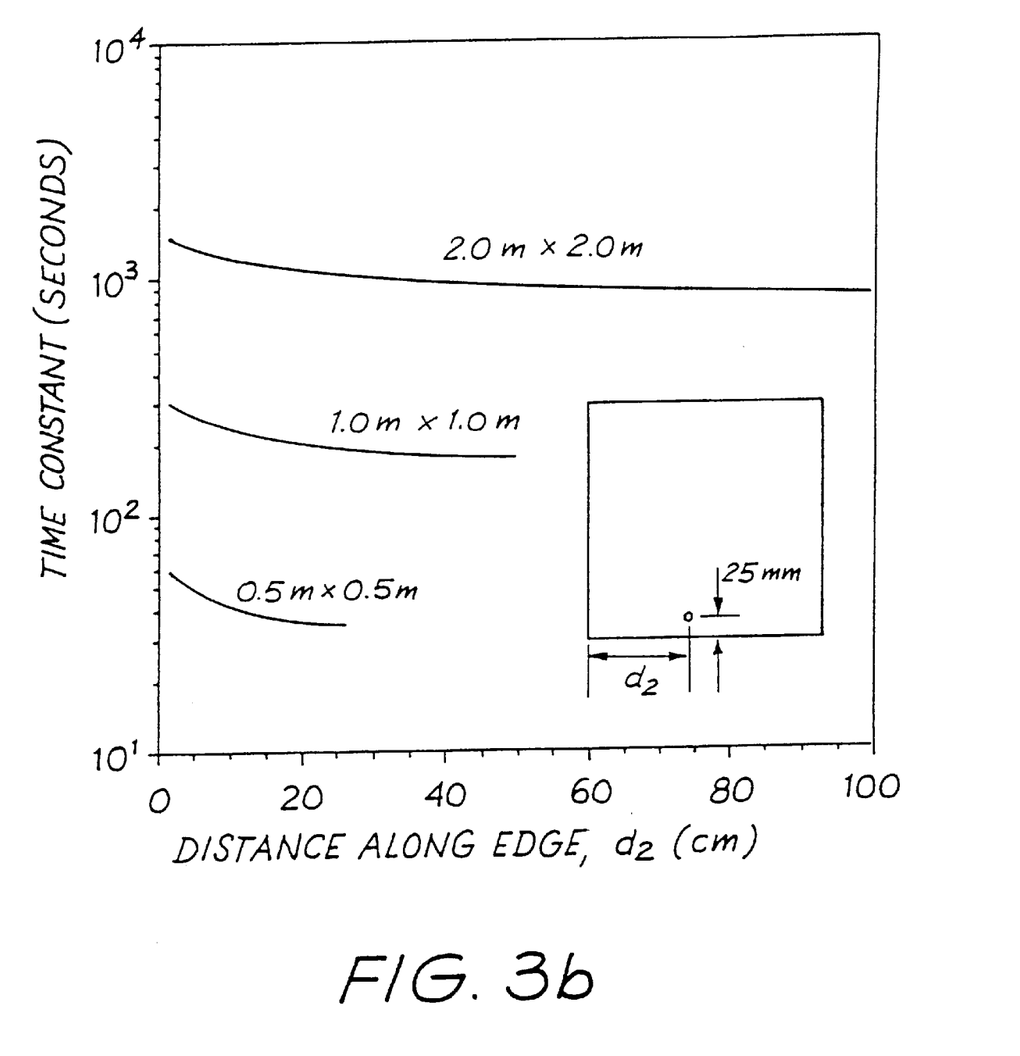
FIG. 3b is a graph of the time constant for pressure reduction within evacuated panels of different sizes with a very small gap (0.01 mm) as a function of the position of the pump-out tube along the edge of the panel in accordance with the third improvement.

The invention will now be described, by way of example only, in which:

FIG. 3a is a graph showing the time constant for pressure reduction in panels of various lateral dimensions, as a function of the gap between the glass sheets; and FIG. 3b is a graph of the time constant for pressure reduction within evacuated panels of different sizes with a very small gap (0.01 mm) as a function of the position of the pump-out tube along the edge of the panel.

Best Made for Carrying out the Third Improvement

FIG. 3a shows the periods of time necessary to reduce the internal pressure in the space between the two glass sheets by a factor of e (approximately 2.72). This period of time is referred to as the "time constant" for pressure reduction within the panel, and is used because the pressure reduction is exponentially related to the time required. Typically about 15 time constants are required to reduce the pressure from atmospheric pressure to an adequately low level when the pump-out tube is located at or near a corner of the panel. The data of FIG. 3a are calculated for a pump-out tube of 0.5 mm in diameter×4 mm long, located near the corner of the glazing and distant by 25 mm from the two adjacent edges.

The inventors have theorised that for small gaps, the dominant factor in determining the time constant for pressure reduction is the low conductance for gas flow in the space between the two sheets of glass. The area of the panel can be roughly divided into two regions where the spatial patterns of gas flow are qualitatively different. When a pump-out tube is located near the corner of the panel, then the flow closer the pump-out tube is radially inwards towards the tube over a full $2\pi$ radians. At some distance away from the pump-out tube the gas flow in the space between the glass sheets is also directed radially towards the corner, but only over approximately $\pi/2$ radians. In the intermediate region a complex of flow pattern exists.

The inventors have found that for many designs of glazing with small gaps, the gas flow in the regions slightly removed from the pump-out tube over $\pi/2$ radians is the dominant factor which determines the time constant for pressure reduction. The inventors have further found that a decrease in the time required-to evacuate the panel can be achieved by relocating the pump-out tube away from the corner to a position closer to the midpoint of one of the sides, and as required by aesthetic considerations close to the edge.

Near the midpoint of one of the sides, the gas flow towards the pump-out tube in regions slightly displaced from the pump-out tube occurs over approximately $\pi$ radians. The conductance for such gas flow when the tube is close to the midpoint of one side is therefore approximately double that which was found when the pump-out tube is near the corner, and the time constant for pressure reduction is therefore less by a corresponding factor.

FIG. 3b shows the values of time constants as a function of the position of the pump-out tube along the is edge of the glass sheets. The data shown are for a sample with a very small gap of only 0.01 mm, and for a pump-out tube which is located 25 mm from one edge. A reduction of the time constant by a factor of approximately 2 is achieved, as expected by the above analysis.

As a result of the reduction in time constant the time necessary to evacuate the panel can be cut by approximately half. This time reduction translates into lower manufacturing costs because of the reduced processing time necessary.

For a 1 $m^2$ sample, with an internal gap of 0.2 mm, evacuated through a pump-out tube 1 mm in diameter and 4 mm long, the time required to evacuate the panel is reduced from about 8 minutes to about 4 minutes, when the pump-out tube is relocated from a region near the corner of the panel to a region near the midpoint of a side.

The Fourth Improvement

The Pump-Out Tube

Introduction

In order to evacuate and seal evacuated glazings, it is necessary to incorporate into their structure a small pump-out tube through which evacuation occurs. The tube is necessary because, after the evacuation and bakeout of the structure, the hole through which the evacuation takes place must be sealed. It is difficult to do this directly on the surface of the glass sheets because the sealing process involves high temperatures which cause stresses in the glass sheets. The end of a small tube can be melted and sealed, however, without the necessity to heat the body of the panel which is being evacuated.

Background

Typically a small glass tube is sealed into a hole which passes through one of the glass sheets using low melting point glass (solder glass). It has been found that using solder glass to seal an abraded glass surface results in joints which have a high probability of leakage, due to gas flow in the abraded region of the glass beneath the solder glass. It is therefore common practice to seal the tube onto the smooth unmachined inner surface of the glass sheet in order to make a leak-free joint. However, one of the problems with this, is that cracks occasionally occur in the relatively exposed solder glass seal between the pump-out tube and the glass sheet. The cracks arise because the thermal expansion of the solder glass does not exactly match that of the glass sheet. Tensile stresses therefore build up in the solder glass at the seal which may result in the formation of cracks.

Summary of the Fourth Improvement

According to the first aspect, the invention provides a thermally insulating glass panel, comprising two spaced apart sheets of glass enclosing a low pressure space and interconnected by an edge seal and an array of support pillars; and further comprising a pump-out tube which penetrates one of the glass sheets and has a radial flange which is cemented to the inner surface of that glass sheet.

The flange may be cemented to the interior surface of the glass sheet by the use of solder glass. Also, the pump-out tube may extend from the interior of the panel through one of the glass sheets to a recess in the outer surface of that sheet, such that the tube does not extend beyond the outer surface of the glass sheet.

The provision of a flange on the pump-out tube, preferably at the interior end, constrains the solder glass cement. In this way it is possible to achieve a very strong joint which does not suffer from the fracture problems of the prior art.

In a further aspect, the invention concerns a method of constructing a thermally insulating glass panel comprising two spaced apart sheets of glass enclosing a low pressure space interconnected by an edge seal and an array of pillars, the method including the step of installing a pump-out tube through one of the glass sheets, whereby the pump-out tube has a radial flange which is sealed to the interior surface of the glass sheet.

Brief Description of the Drawings

Figure 4A:
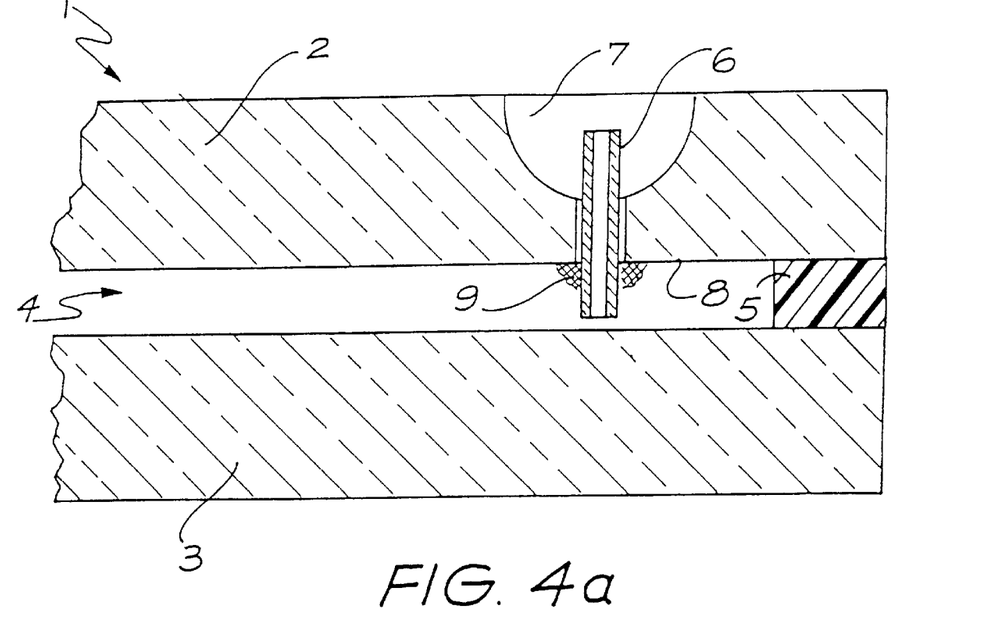
FIG. 4a is a sectional view through the edge of a thermally insulated glass panel showing a known pump-out tube arrangement.
Figure 4B:
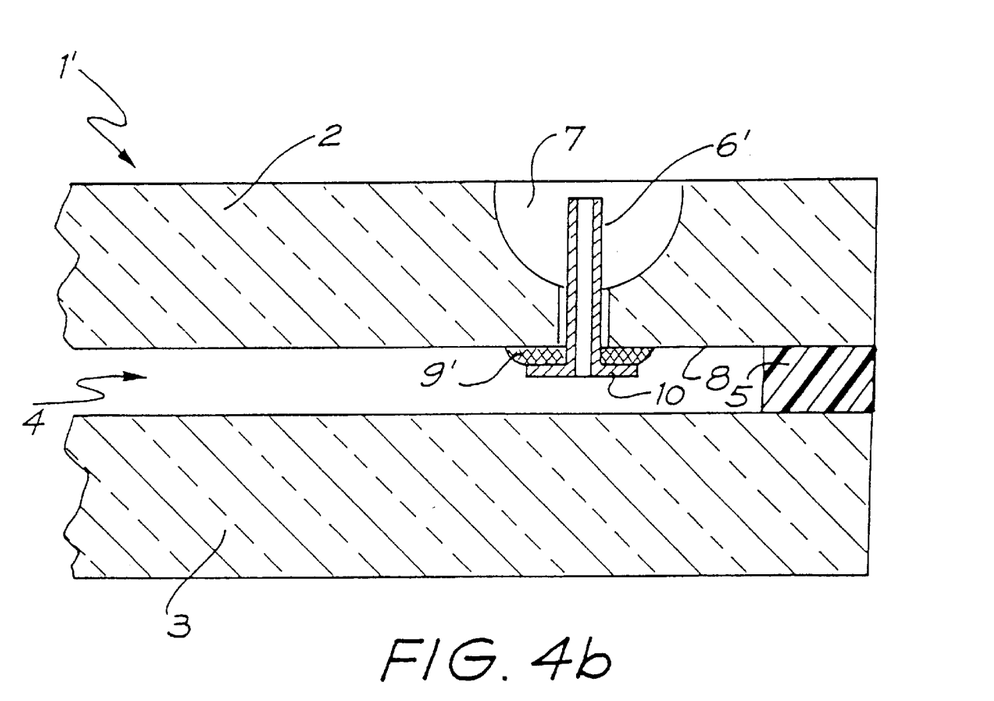
FIG. 4b is a sectional view through the edge of a thermally insulating glass panel showing a pump-out tube arrangement in accordance with the fourth improvement.

FIG. 4a is a sectional view through the edge of a thermally insulated glass panel showing a known pump-out tube arrangement; and FIG. 4b is a sectional view through the edge of a thermally insulating glass panel showing a pump-out tube arrangement embodying the present invention.

The same reference numerals have been used in both drawings to refer to corresponding elements.

Best Mode for Carrying Out the Fourth Improvement

Referring now to FIG. 4a, thermally insulating glass panel 1 comprises two spaced apart sheets of glass 2 and 3 enclosing a low pressure space 4. Glass sheets 2 and 3 are interconnected by an array of support pillars (not shown) and an edge seal 5. A pump-out tube 6 extends through glass sheet 2 from the interior space 4 to the bottom of a well 7 in the exterior surface of glass sheet 2. Tube 6 is sealed to the interior surface 8 of glass sheet 2 by solder glass cement 9.

FIG. 4b, in contrast, shows part of glass panel 1' in which a pump-out tube 6' has a radial flange 10 on its inner end. Tube 6' is sealed to the interior surface 8 of glass sheet 2 by solder glass 9' deposited between flange 10 and inner surface 8. The solder glass is melted at high temperatures, created during the fabrication process, and flows into the gap formed between flange 10 and interior surface 8 to form a very strong joint. Because solder glass 9' is constrained by flange 10 and inner surface 8, it is not so prone to the formation of cracks due to the differential thermal expansion between the solder glass and the glass of sheets in the pump-out tube.

Although the invention has been described with reference to a particular embodiment it should be appreciated that they may be embodied in other ways, for instance flange 10 need not be positioned at the extreme end of pump-out tube 6'.

We claim:

1. A thermally insulating glass panel, comprising:

two sheets of glass, each said sheet having a continuous peripheral edge and a central region within said peripheral edge;

an edge seal of solder glass connecting said glass sheets in spaced facing relation by extending between the respective peripheral edges of the glass sheets, said glass sheets and said edge seal enclosing a space of reduced pressure in comparison to ambient atmospheric pressure; and an array of support pillars extending between said respective central regions of said glass sheets and maintaining said glass sheets in said spaced facing relation, said support pillars within said array having cross-sectional dimensions, spatial relationships and compressive strengths selected to limit deflection of said class sheets by the ambient atmospheric pressure to an extent which limits induction of tensile stress in said glass sheets adjacent said edge seal sufficient to avoid stress failure thereof under the ambient atmospheric pressure;

wherein each said support pillar in said array has a compressive strength selected to avoid inelastic compression thereof by the deflection of said glass sheets under the ambient atmospheric pressure.

2. A panel according to claim 1, wherein said pillars are made from a material having a selected mechanical compressive strength greater than 750 MPa.

3. A panel according to claim 1, wherein said pillars are made from a material having a selected mechanical compressive strength greater than a value of 1000 MPa.

4. A panel according to claim 1, wherein said pillars are made from a material selected from the group consisting of hardened tungsten, tantalum, molybdenum, high strength steel alloys, and ceramic materials.

5. A panel according to claim 4, wherein the ceramic material includes high strength alumina (aluminium oxide).

6. A panel according to claim 4, wherein the ceramic material includes zirconia (zirconium oxide).

* * * * *